(12) United States Patent
Belpaire (10) Patent No.: US 10,793,089 B2
(45) Date of Patent: Oct. 6, 2020

(54) PRINTED DAMPING ELEMENT

(71) Applicant: SIKA TECHNOLOGY AG, Baar (CH)

(72) Inventor: Vincent Belpaire, Uccle (BE)

(73) Assignee: SIKA TECHNOLOGY AG, Baar (CH)

(*) Notice: Subject to any disclaimer, the term of this patent is extended or adjusted under 35 U.S.C. 154(b) by 0 days.

(21) Appl. No.: 16/467,139

(22) PCT Filed: Dec. 5, 2017

(86) PCT No.: PCT/EP2017/081586
§ 371 (c)(1),
(2) Date: Jun. 6, 2019

(87) PCT Pub. No.: WO2018/104343
PCT Pub. Date: Jun. 14, 2018

(65) Prior Publication Data
US 2019/0315291 A1 Oct. 17, 2019

(30) Foreign Application Priority Data
Dec. 9, 2016 (EP) ..................................... 16203278

(51) Int. Cl.
*B60R 13/08* (2006.01)
*B33Y 80/00* (2015.01)
(Continued)

(52) U.S. Cl.
CPC ........ *B60R 13/0815* (2013.01); *B29C 44/188* (2013.01); *B33Y 80/00* (2014.12);
(Continued)

(58) Field of Classification Search
CPC ................................................ B60R 13/0815
(Continued)

(56) References Cited

U.S. PATENT DOCUMENTS

| 5,266,133 A | 11/1993 | Hanley et al. |
| 5,373,027 A | 12/1994 | Hanley et al. |

(Continued)

FOREIGN PATENT DOCUMENTS

| EP | 0 204 970 A2 | 12/1986 |
| WO | 99/37506 A1 | 7/1999 |

(Continued)

OTHER PUBLICATIONS

Feb. 15, 2018 International Search Report issued in International Patent Application No. PCT/EP2017/081586.
(Continued)

*Primary Examiner* — Brent T O'Hern
(74) *Attorney, Agent, or Firm* — Oliff PLC (57) ABSTRACT

A dam element for the damming of a structure element within a vehicle includes a support element and an expandable element. The support element consists of at least one printed strand of a first material, where the first material is in a solid physical state at least up to a temperature of from 120° C. to 200° C., and the expandable element consists of at least one printed strand of a second material, where the second material is expandable at a temperature between 120° C. and 200° C. The dam element here has, at a point of greatest thickness, measured perpendicularly to a plane of the dam element, at least two, and at most ten, mutually superposed layers.

15 Claims, 6 Drawing Sheets

(51) Int. Cl.
*B29C 44/18* (2006.01)
*B29K 101/12* (2006.01)
*B29K 105/04* (2006.01)
*B29L 9/00* (2006.01)
*B29L 31/30* (2006.01)

(52) U.S. Cl.
CPC ...... *B29K 2101/12* (2013.01); *B29K 2105/04* (2013.01); *B29L 2009/00* (2013.01); *B29L 2031/30* (2013.01); *B60R 2013/0807* (2013.01)

(58) Field of Classification Search
USPC .......................................................... 428/220
See application file for complete search history.

(56) References Cited

U.S. PATENT DOCUMENTS

| | | | |
|---|---|---|---|
| 6,114,004 A * | 9/2000 | Cydzik | ................... B60R 13/08 |
| | | | 428/81 |
| 6,387,470 B1 | 5/2002 | Chang et al. | |

FOREIGN PATENT DOCUMENTS

| | | |
|---|---|---|
| WO | 2005/080524 A1 | 9/2005 |
| WO | 2009/021537 A1 | 2/2009 |
| WO | 2014/108857 A1 | 7/2014 |

OTHER PUBLICATIONS

Jun. 11, 2019 International Preliminary Report on Patentability issued in International Patent Application No. PCT/EP2017/081586.

* cited by examiner

PRINTED DAMPING ELEMENT

TECHNICAL FIELD

The invention relates to a dam element with a support element and with an expandable element, in particular for the damming of a structure element with a cavity within a vehicle. It further relates to a system with a structure element and with, arranged therein, a dam element, and also to a process for the production of a dam element.

BACKGROUND

In order to permit lightweight design, modules such as bodywork and/or frames of means of transport and of conveyance, in particular of vehicles for use on water or on land, or of aircraft, often have structures with cavities. However, said cavities cause a very wide variety of problems. In order to prevent ingress of moisture and contaminants that can lead to corrosion of the modules, it is necessary to seal the cavity in a manner that depends on the cavity type. It is often also desirable to provide substantial reinforcement of the cavities, and thus of the module, but to retain the low weight. It is often also necessary to stabilize the cavities, and therefore the modules, in order to reduce noise that otherwise would be transmitted along, or through, the cavity. Many of these cavities have an irregular shape or small dimensions, increasing the difficulty of achieving effective sealing, reinforcement and damming of said cavities.

In particular in automobile construction, but also in aircraft construction and boatbuilding, baffles are therefore used in order to seal cavities and/or provide acoustic isolation thereof, or reinforcers are used for reinforcement of cavities.

Figure 1:
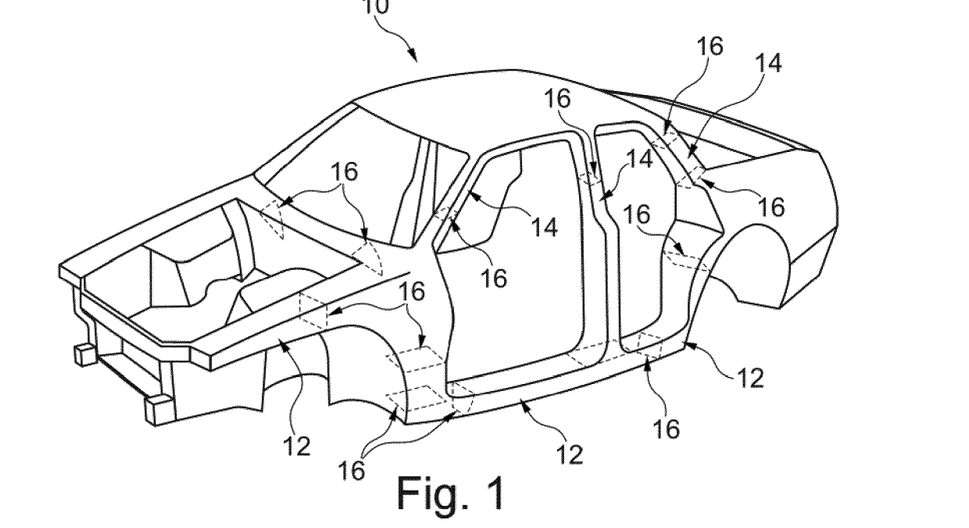
FIG. 1 depicts by way of example bodywork of the prior art.

FIG. 1 is a diagram of bodywork of an automobile. The bodywork 10 here comprises various structures with cavities, for example pillars 14 and supports or struts 12. These structure elements 12, 14 with cavities are usually sealed by and, respectively, reinforced by sealing and/or reinforcing elements 16.

Figure 2A:
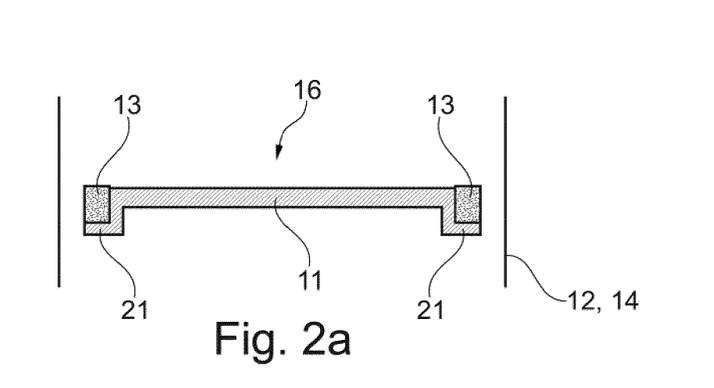
FIGS. 2a and 2b are diagrams to explain an example of a dam element of the prior art.
Figure 2B:
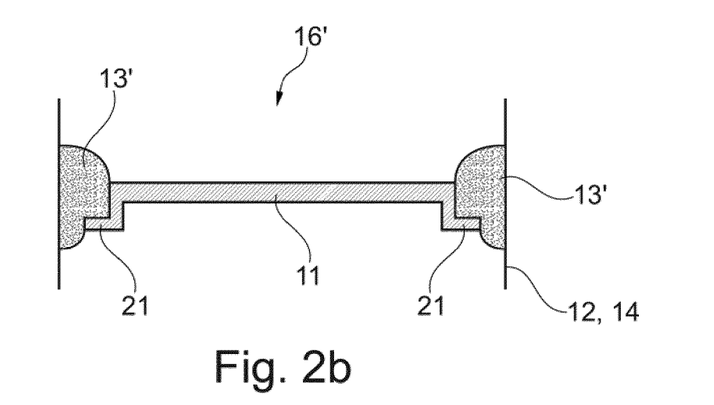

FIGS. 2a and 2b are diagrams of a known concept for the sealing and/or reinforcing closure of openings or cavities in a motor vehicle. FIG. 2a here shows a dam element 16 before an expansion of an expandable material 13. FIG. 2b shows the same dam element 16, but after an expansion of the expandable material 13, i.e. with the expanded material 13'.

The location of the dam element 16 is within a cavity of a bodywork structure of the type depicted by way of example in FIG. 1. FIGS. 2a and 2b are diagrams of a section of such a structure element 12, 14 of a bodywork. The dam element 16 comprises a support element 11, which has an edge region 21. The arrangement here has the expandable material 13 in essence on said edge region 21 of the support element 11.

Before the expansion of the expandable material 13, there is a gap between the dam element 16 and the structure element 12, 14. This gap permits coating of the structure element 12, 14 in order to protect the structure element 12, 14 from corrosion. After said coating, the expandable material 13 is usually expanded through exposure to heat, whereupon the expanded material 13' thus closes the gap between the dam element 16 and the structure element 12, 14. The expansion of the expandable material 13 also simultaneously achieves fixing of the dam element 16' in the structure element 12, 14. A Dam element 16' thus secured in the structure element 12, 14 on the one hand reinforces the structure element 12, 14 and on the other hand seals the cavity in the structure element 12, 14.

A disadvantageous aspect of such dam elements 16 is that production thereof requires large capital expenditure for appropriate tooling.

The reason for this is that conventional dam elements 16 are usually produced by an injection-molding process, for example a single-component or two-component injection-molding process. This conventional injection-molding process is economic for the production of large numbers of units, because the high capital expenditure for tooling is compensated by very low production costs of an individual dam element. For the production of smaller numbers of units, however, this relationship shifts in a manner such that the low production costs of the individual dam element cannot outweigh the high capital expenditure for tooling.

Alternative production methods have already been proposed in order to overcome this problem, an example being profile extrusion or a multilayer punching process. Although such alternative technologies do not require large capital expenditure for tooling, they have limitations in respect of the geometry of the dam element. However, the cavities in vehicles often have complex shapes, and it is therefore necessary to have the ability to produce correspondingly complex shapes of a dam element.

Another alternative process is described by way of example in WO 2014/108857 A1. The expandable material here is extruded onto a substrate. This permits production of individual shapes for small numbers of units of expandable material. However, this method does not permit efficient production of a dam element, because in each case a support for the expandable material has to be separately produced and introduced into the system.

SUMMARY

The invention is therefore based on the object of providing a dam element, and also a process for the production of a dam element, of the type explained above, where said dam element can be produced without large capital expenditure for tooling, and where said process can also produce more complex three-dimensional shapes of the dam element. A further intention is that the dam element, and the process for the production of a dam element, are amenable to low-cost production, so that it is also possible to achieve economically efficient production of relatively large numbers of units.

BRIEF DESCRIPTION OF THE DRAWINGS

Details and advantages of the invention are described below on the basis of embodiments and with reference to diagrams.

FIGS. 5a to 7b are diagrams of an example of a support element, respectively with and without expandable element;

DETAILED DESCRIPTION

Said object is firstly achieved via a dam element for the damming of a structure element within a vehicle, where the dam element firstly comprises a support element. The support element consists of at least one printed strand of a first material, where the first material is in a solid physical state at least up to a temperature of from 120° C. to 200° C. The dam element moreover comprises an expandable element consisting of at least one printed strand of a second material, where the second material is expandable at a temperature between 120° C. and 200° C. The dam element here has, at a point of greatest thickness, measured perpendicularly to a plane of the dam element, at least two, and at most ten, mutually superposed layers.

This solution has the advantage that a very efficient production process can be provided through the use of a limited number of mutually superposed layers. As the number of mutually superposed layers that have to be printed increases, the time required for the production of an element generally increases, and this leads to higher production costs. Restriction of the number of mutually superposed layers therefore reduces the time consumed, and also the cost incurred, for the production of this type of printed dam element.

A concept central to the present invention is that for this application it is not essential that a surface either of the support element or of the expandable element is of finely structured design. The expandable element changes its shape on expansion when heated, and therefore the function of said element is not crucially dependent on an original exterior shape.

The function of the support element in turn consists in particular in the positioning of the expandable element within a structure element, and also structure-reinforcement of the entire system. Both of these functions can also be ensured by using support elements composed of relatively large components, in particular of relatively thick strands. Use of strands having relatively large dimensions for the production of printed dam elements is found to be particularly advantageous because it permits realization of a significantly more efficient production process. The disadvantages of a relatively coarsely structured surface, for example larger manufacturing tolerances, are often accepted to a certain degree in this application sector.

The term "dam element" in the context of this invention comprises elements for the isolation and/or reinforcement and/or damming of a structure element, i.a. not only the technical term "baffle" but also the technical term "reinforcer". The various properties of said dam element can be apparent here individually or else in combination with one another.

The term "printing" or "printed" in the context of this invention comprises in particular a process and, respectively, result thereof which is generally known as three-dimensional print. Strands of a material are laid, or mutually superposed to form a structure, here onto a bed element. The manner of formation of the strands here is by way of example such that after they are placed in contact with one another and/or are mutually superposed they become connected to one another while in essence retaining their original cross section during the printing procedure.

The term "strand" in the context of this invention comprises the element which is replaced during printing onto a bed element or onto a previously printed strand. The strands here can be formed from various materials, and with various cross sections.

The term "layer" in the context of this invention comprises strands which are printed onto a shared bed element. In the case of a flat bed element, all of the strands of a layer therefore lie within a shared plane. In the case of a non-flat bed element, the strands of a layer do not lie within a shared plane, but instead in essence replicate a topography of the non-flat bed element. Bed elements here can be elements for single use or for multiple reuse, or else can be pre-existing layers which themselves have been printed on a bed element or onto a layer. Layers can moreover consist of a single printed material or of various printed materials.

The term "trace" in the context of this invention comprises an element consisting of a continuously printed strand, i.e. a unit which is placed onto a bed element or onto a previously printed layer without withdrawal of a printing head and without interruption of the flow of material. For some shapes of an element, for example a support element or an expandable element, said element can consist of only a single trace. In particular, a single trace can also form a plurality of mutually superposed layers.

The first material for the formation of a support element can comprise various materials. Preferred materials are plastics, in particular polyurethanes, polyamides, polyesters and polyolefins, preferably high-temperature-resistant polymers such as poly(phenylene ethers), polysulfones or polyether sulfone. Particular preference is given to polyamide, in particular polyimide 6, polyamide 6,6, polyamide 11, polyamide 12, or a mixture thereof. Combinations with fibers, for example glass fibers, mineral fibers, vegetable fibers, textile fibers or carbon fibers, can also be used.

The printing of this first material is preferably carried out by fused deposition modeling. In a preferred variant, pellets of first material are melted to form the printable composition.

Material that can be used as second material to form the expandable element is in principle material of different type that is amenable to thermal foaming. This material can have reinforcing properties, or else can lack reinforcing properties.

This expandable material typically comprises a chemical or physical blowing agent. Chemical blowing agents are organic or inorganic compounds which decompose on exposure to heat, moisture or electromagnetic radiation, at least one of the decomposition products being a gas. Compounds that can be used as physical blowing agents are by way of example those that undergo conversion to the gaseous physical state at increased temperature. Chemical and physical blowing agents are therefore capable of producing foam structures in polymers.

It is preferable that the expandable material is foamed thermally with use of chemical blowing agents. Materials suitable as chemical blowing agents are by way of example azodicarbonamides, sulfohydrazides, hydrogencarbonates or carbonates.

Suitable blowing agents are by way of example also obtainable commercially with the trademark Expancel® from Akzo Nobel, Netherlands, or with trademark Celogen® from Chemtura Corp., USA.

The heat required for foaming can be introduced via external or internal heat sources, for example an exothermic chemical reaction. The foamable material is preferably foamable at a temperature of ≤200° C., in particular from 120° C. to 190° C., preferably from 160° C. to 180° C.

Examples of suitable expandable materials are single-component epoxy resin systems that do not flow at room temperature which in particular have relatively high impact resistance, and which comprise thixotropizing agents such as Aerosils or nanoclays. These epoxy resin systems comprise by way of example from 20 to 50% by weight of a liquid epoxy resin, from 0 to 30% by weight of a solid epoxy resin, from 5 to 30% by weight of toughness modifiers, from 1 to 5% by weight of physical or chemical blowing agents, from 10 to 40% by weight of fillers, from 1 to 10% by weight of thixotropizing agents and from 2 to 10% by weight of heat-activatable hardeners. Suitable toughness modifiers are reactive liquid rubbers based on nitrile rubber or are derivatives of polyether polyol polyurethanes, or are core-shell polymers or similar systems known to the person skilled in the art.

Expandable materials that are likewise suitable are single-component polyurethane compositions that comprise blowing agents and that are composed of crystalline polyesters having OH groups in a mixture with other polyols, preferably polyether polyols, and with polyisocyanates having blocked isocyanate groups. The melting point of the crystalline polyester should be ≥50° C. The isocyanate groups of the polyisocyanate can be blocked by way of example with nucleophiles such as caprolactam, phenols or benzoxalones. Other suitable materials are blocked polyisocyanates of the type used by way of example in powder coating technology and obtainable commercially by way of example with the trademarks Vestagon® BF 1350 and Vestagon® BF 1540 from Degussa GmbH, Germany. Materials likewise suitable as isocyanates are those known as encapsulated or surface-deactivated polyisocyanates; these are known to the person skilled in the art and are described by way of example in EP 0 204 970.

Other suitable expandable materials are two-component epoxy/polyurethane compositions of the type described by way of example in WO 2005/080524 A1, comprising blowing agents.

Other suitable expandable materials are ethylene-vinyl acetate compositions comprising blowing agents.

Expandable materials that are likewise suitable are marketed with the trademark SikaBaffle® 240, SikaBaffle® 250 or SikaBaffle® 255 by Sika Corp., USA and described in the U.S. Pat. Nos. 5,266,133 and 5,373,027.

Other suitable expandable materials are marketed with the trademarks SikaBaffle®-450, SikaBaffle®-420, SikaBaffle®-250NT, SikaBaffle®-255 and SikaBaffle®-250PB2 by Sika. The expansion rate of these expandable materials is about 300-3000%, and they are particularly preferred for the present invention.

Examples of materials preferred as expandable materials with reinforcing properties are those marketed with the trademark SikaReinforcer® 941 by Sika Corp., USA. These are described in U.S. Pat. No. 6,387,470.

In an example of an embodiment, the printed strands of the first material and/or of the second material have a rounded cross section with diameter from 1 mm to 6 mm, particularly preferably from 3 mm to 5 mm. "Rounded" in this context means that the strands initially, during printing, have a cross section that is in essence round. Immediately after discharge from a printing head, this cross section can undergo change due to the effect of gravity.

In an alternative embodiment, the printed strands of the first material and/or of the second material have a cross section with height from 1 mm to 6 mm, particularly preferably from 1 mm to 3 mm, and width from 2 mm to 30 mm, preferably from 4 mm to 20 mm. The height here is measured perpendicularly to the plane of the dam element, and the width is measured within the plane of the dam element and perpendicularly to a longitudinal axis of the strands.

Provision of strands with the above dimensions has the advantage that this permits production of dam elements made of a small number of layers. The production process can therefore be faster and more efficient.

It is possible here by way of example to use respectively a layer of the first material to form the support element and a layer of the second material to form the expandable element.

Various combinations of the layers made of the first and of the second material are moreover possible: by way of example, two layers of the first material can be combined with one layer of the second material, or four layers of the second material can be combined with two layers of the first material. A number and arrangement of the layers can be established for a particular case as required by the application sector and the dimensions of the individual strands. It is also possible here by way of example that the cross section of strands of the first material differs from that of strands of the second material.

It is moreover possible by way of example that strands of the first material have a rounded cross section and that strands of the second material have an elongate cross section, or vice versa.

At the thickest point of the dam element, there are at most ten layers mutually superposed. In a preferred embodiment, there are at most eight or at most six or at most four mutually superposed layers at the thickest point of the dam element.

In an example of an embodiment, the dam element has at least one arm which is at least to some extent at an angle to the plane of the dam element, and which is composed of the first material or of the second material or of the first and the second material.

Formation of such arms firstly has the advantage that it allows expandable material to reach angular regions of the structure element that are difficult to access. To this end, the arms are preferably configured only from the second material or from the first and the second material.

Secondly, a further advantage of such arms is that they can increase mechanical stability of the dam element in that these angled arms can stabilize a position of the dam element in the structure element. Such arms can moreover also be used to form hooks or bracing points which fasten or brace the dam element on the structure element. To this end, it is preferable that the arms are configured from the first material.

In an example of an embodiment, the support element and/or the expandable element consist(s) of at least one, and at most ten, continuous trace(s). In an alternative embodiment, the support element and/or the expandable element consist(s) of at least one, and at most eight or at most six or at most four or at most two continuous trace(s).

In an example of an embodiment, the support element is produced from only a single continuous trace. In an example of a further development, the expandable element is also produced from only a single continuous trace.

Provision of a small number of traces to form the support element and/or the expandable element has the advantage that the process for producing the dam element can become more efficient and can be optimized in relation to cost. The more often operation of a printer has to be recommenced after interruption to form a new trace, the longer the time generally required to produce a printed element.

In an example of an embodiment, the dam element comprises a fastening element for the fastening of the dam element within the structure element. In an example of an embodiment, the fastening element is configured as clip.

In an example of a further development, the fastening element comprises injection-molded plastic and/or comprises metal.

Formation of the fastening element from injection-molded plastic and/or from metal has the advantage that it is thus possible to produce fastening elements with a surface structure that is finer than that of, for example, the printed support element. Greater precision with smaller tolerances is important because the fastening element interacts with corresponding structures in the bodywork. This type of structure with greater precision of detail can advantageously be achieved by using injection-molded plastics parts or parts produced from metal.

In an example of a further development, the fastening element has a base which lies within the plane of the dam element and which is cramped between two mutually superposed layers, or is in contact only with one layer.

Provision of this type of base of the fastening element has the advantage that it is thus possible to achieve easy connection of the fastening element to the printed layers of the dam element. By way of example, after the printing of a first layer the fastening element can be placed onto said first layer, whereupon a second layer printed thereon then cramps the base of this fastening element between the first layer and the second layer.

In an example of a further development, the fastening element has a projection which is oriented in essence perpendicularly to the base, and which is cramped between two strands that, within the plane of the dam element, are adjacent to one another, or which is in lateral contact only with one strand.

Provision of this type of projection on the base of the fastening element has the advantage that it is thus possible to achieve further-improved linkage of the fastening element to the strands or, respectively, layers of the dam element. In particular, it is thus possible to cramp the fastening element not only horizontally but also vertically between strands or, respectively, layers of the dam element. It is possible here that the fastening element is in contact only with strands or, respectively, layers of the support element, is in contact only with strands or, respectively, layers of the expandable element, or is in contact not only with the strands or, respectively, layers of the support element but also with strands or, respectively, layers of the expandable element. It is moreover possible that base and projection are cramped between adjacent strands or, respectively, layers or are externally in contact with strands or, respectively, layers. Suitable combinations can be selected here as required by a usage variant.

A system is moreover proposed for the achievement of the object mentioned in the introduction, with a structure element and, arranged therein, a dam element. The dam element can in particular be designed as described above.

In an example of an embodiment, before an expansion of the expandable element, the dam element covers from 20 to 60%, preferably from 20 to 40%, of a cross section of the structure element.

This type of covering of the cross section of the structure element by the dam element has the advantage that it is thus possible to maximize dam effect while minimizing use of material. By virtue of the printing production method proposed here it is possible to arrange the various materials precisely where they fulfil their function, and it is therefore possible to avoid any unnecessary coverage of the cross section of the structure element.

The object mentioned in the introduction is moreover achieved by a process for the production of a dam element with a support element and with an expandable element for the use within a structure element of a vehicle. The process comprises the steps of: provision of a bed element; printing of at least one strand made of a first material for the formation of a support element, where the first material is in a solid physical state at least up to a temperature of from 120° C. to 200° C.; printing of at least one strand made of a second material for the formation of an expandable element, where the second material is expandable at a temperature of from 120° C. to 200° C.; and removal of the dam element from the bed element; where the strands are printed in a manner such that the dam element has, at a point of greatest thickness, measured perpendicularly to a plane of the dam element, at least two, and at most ten, mutually superposed layers.

The advantage of such a process is in turn that through the provision of a minimized number of printed layers it is possible to provide a print procedure or, respectively, production process of maximized efficiency for the production of the dam element.

In a preferred variant only one layer made of the first material, and only one layer made of the second material, is printed, and therefore the dam element has, at a point of greatest thickness, only two mutually superposed layers. The efficiency of production of printed dam element is thus maximized.

In an example of an embodiment, the printing of the expandable element is carried out before the printing of the support element.

A print sequence of the layers made of the first material and of the layers made of the second material can in principle be freely selected. However, printing of the support element onto the expandable element has proven to be particularly advantageous.

In an example of an embodiment, the printed support element covers, in a viewing direction perpendicular to the plane of the dam element, at least 90% of the expandable element.

Maximized completeness of coverage of the expandable element by the support element has the advantage of ensuring maximized effectiveness of support of the expandable element by the support element in a use of the dam element in the bodywork of a vehicle. In this way it is possible to maximize effectiveness of control of foaming or expansion of the expandable material.

In an example of an embodiment, the bed element has depressions and/or elevations for the formation of arms which at least to some extent are at an angle to the plane of the dam element.

Formation of such arms has the advantage that it permits more complex three-dimensional shaping of the dam element. Because cavities in bodywork of vehicles often have complex three-dimensional shapes, it is advantageous to maximize effectiveness of replication of these complex three-dimensional shapes by the dam element. This permits better damming of the respective cavity.

The arms thus formed can be composed either only of the first material, only of the second material, or of the first and the second material. By way of example, such arms formed only from the first material can be used as three-dimensional stabilizers to stabilize a position of the dam element within a structure element. On the other hand, by way of example, arms which consist only of the second material can be used to permit complete foam-filling of angular regions that are difficult to access in a cavity. Arms consisting of first and second material can by way of example form curved ends of the dam element which correspond to a shape of the cavity within the structure element.

In an example of the embodiment, the bed element has a positioning element, and the process comprises the step of: attachment of a fastening element within the positioning element and onto a strand of the first and/or second material.

In a preferred further development, the positioning element is configured as cutout in the bed element. By way of example, this cutout can have a basal outline corresponding at least to some extent to a basal outline of the fastening element.

This has the advantage that fastening elements can be attached in an intended and reproducible position on the dam element.

The attachment of the fastening element at the positioning element and on a strand of the first and/or of the second material can take place here before the printing of the first and second material, after the printing of the first and second material, or therebetween.

In an example of an embodiment, during removal of the dam element from the bed element ejector elements are moved in relation to the bed element.

In an example of a further development, said ejector elements are configured as pins which can be moved through the bed element.

Provision of such ejector elements has the advantage of permitting removal of the dam element from the bed element in an efficient and gentle manner after completion of printing.

In a preferred embodiment, the process comprises the further step of: reuse of the bed element for production of a following dam element after a dam element has been removed from the bed element.

Reuse of the bed element has the advantage that it permits further optimization of the production process in respect of production time and production costs. It avoids any requirement to provide the bed element in newly printed form, or other new form, for each dam element; this is in particular advantageous in the case of relatively complex bed elements with elevations and/or depressions or with positioning elements.

Figure 3A:
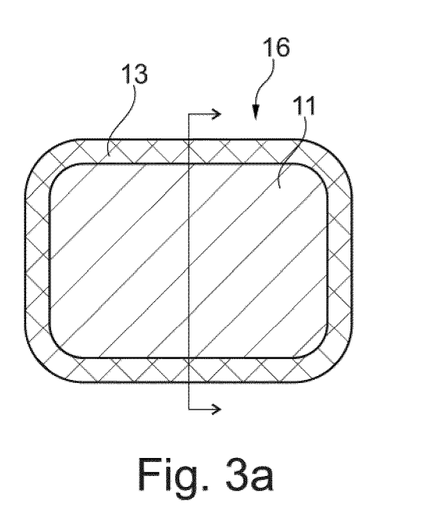
FIGS. 3a to 3c are diagrams of an example of dam element in plan view and cross section.
Figure 3B:
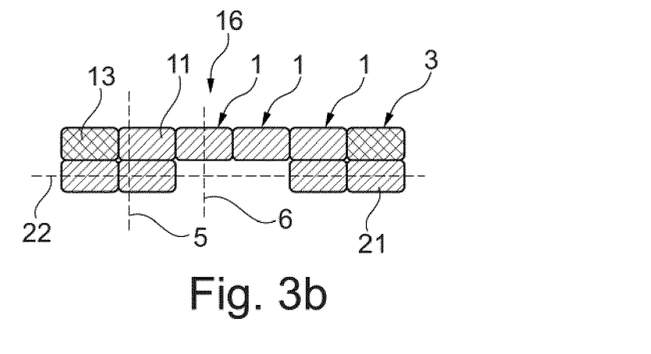
Figure 3C:
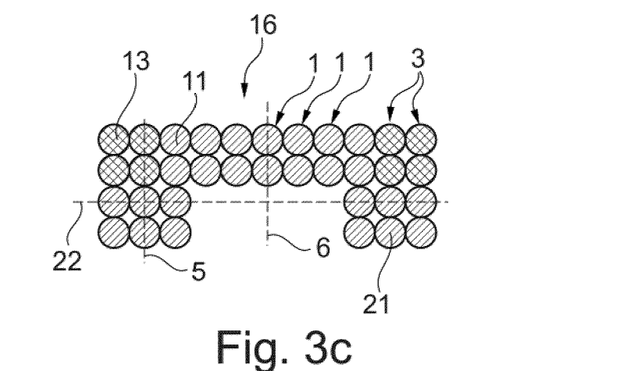

FIGS. 3a to 3c depict a first variant of an example of dam element 16. This example of dam element 16 has a conventional shape of dam element, as also depicted in FIGS. 2a and 2b. FIG. 3a here shows a plan view of the example of dam element 16, and FIGS. 3b and 3c respectively show different variants of a cross section through the dam element 16, along the section line included in the drawing in FIG. 3a.

The dam element 16 comprises a support element 11 consisting of at least one printed strand 1 of a first material, and comprises an expandable element 13 consisting of at least one printed strand 3 of a second material. In the variant of FIG. 3b, the dam element 16 has, at a thickest point 5, measured perpendicularly to a plane 22 of the dam element 16, two mutually superposed layers. In the variant of FIG. 3c, the dam element 16 has, at the thickest point 5, measured perpendicularly to the plane 22 of the dam element 16, four mutually superposed layers. In this embodiment, according to FIG. 3c, there are respectively two layers of the second material placed on respectively two layers of the first material.

As can be seen from this embodiment, it is not essential that the entire support element 11 is covered by the expandable element 13. It is also possible that only subregions of the support element 11 are covered by expandable element 13. As shown here, it is possible by way of example that only an edge region 21 of the support element 11 is covered by expandable material 13.

The dam element 16 also has, alongside the thickest point 5, measured perpendicularly to the plane 22 of the dam element 16, a thinnest point 6, likewise measured perpendicularly to the plane 22 of the dam element 16. It is possible here that this thinnest point 6 and the thickest point 5 have the same number of layers or a different number of layers. However, the thinnest point 6 also has at most ten mutually superposed layers and at least one layer.

Figure 4A:
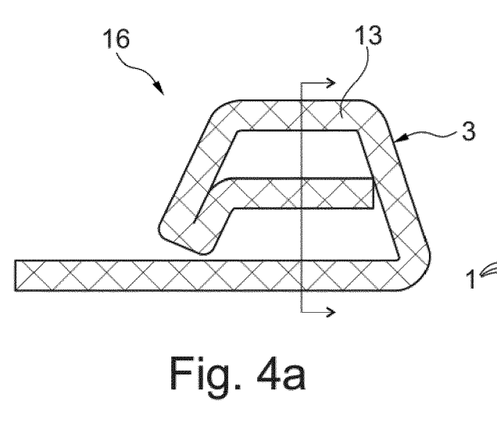
FIGS. 4a and 4b are diagrams of an example of dam element in plan view and in cross section.
Figure 4B:
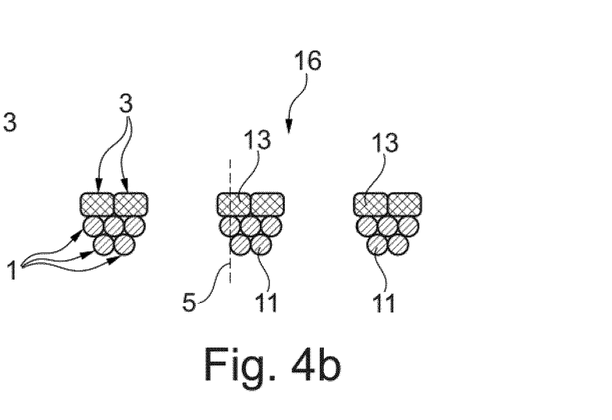

FIGS. 4a and 4b depict a further example of dam element 16. FIG. 4a here shows a plan view of the example of dam element 16, and FIG. 4b here depicts a cross section along the section line shown in FIG. 4a of the dam element 16. In this embodiment, the dam element 16 is not configured flat like conventional dam elements, but instead has a skeletal shape. This type of shape of the dam element 16 can easily be produced by the printing process proposed here for the production of the dam element 16. By way of example, the shape depicted in FIG. 4a for the dam element 16 can be produced with just a single continuous path. This is a particularly efficient variant for the production of dam element 16 because there is never any requirement here for operation of a printing head to recommence after interruption.

In this embodiment, support element 11 and expandable element 13 in essence cover one another. The expandable element 13 here consists of one layer arranged on respectively two mutually superposed layers of the support element 11. The example of dam element 16 in this embodiment therefore has, at a thickest point 5, three mutually superposed layers, namely a layer made of a second material on two layers made of the first material.

FIGS. 5a to 7b respectively depict further examples of dam elements 16 where for each embodiment firstly only the support element 11 is depicted and secondly the entire dam element 16 is depicted, comprising support element 11 and expandable element 13.

In these embodiments, there is respectively a fastening element 8 arranged on the dam element 16. The fastening element 8 can by way of example be designed as clip with a base 18, where the base 18 in essence lies within the plane of the dam element 16. The fastening element 8 can by way of example be in an injection-molded plastics part or a punched metal part. For fastening on the dam element 16, these fastening elements 8 can be arranged between mutually superposed layers, or else can also (not depicted) be arranged in contact with one side, on a lower side, or on an upper side, of the dam element 16.

Figure 5A:
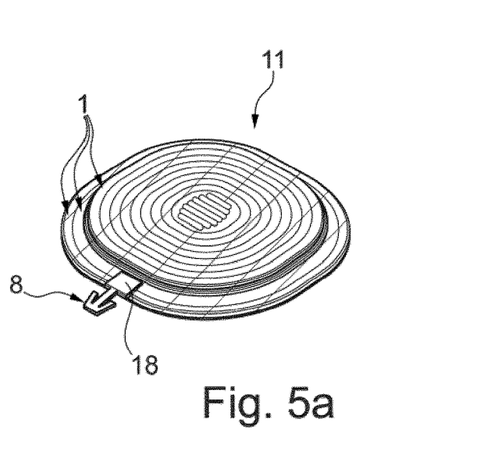
Figure 5B:
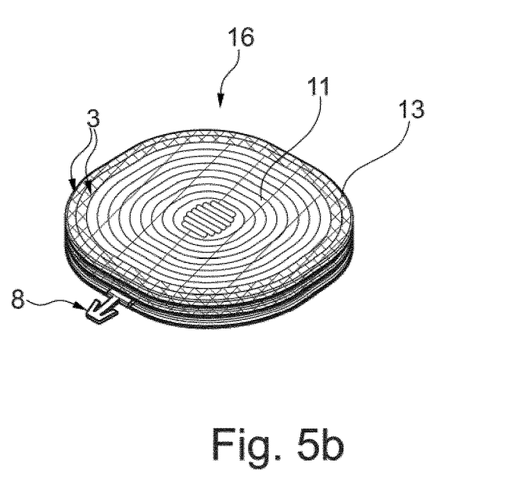

The example of a dam element 16 in FIGS. 5a and 5b extends only within a single plane. The examples of dam elements in the embodiments in FIGS. 6a to 7b differ therefrom in additionally having arms 4 configured at least to some extent at an angle to the plane of the dam element 16. These arms 4 serve by way of example as three-dimensional stabilizers to stabilize the dam element 16 in the cavity of the structure element; there can also, as depicted in FIG. 7b, additionally be arms configured with expandable element 4 which can reach into spaces that are difficult to access within an irregularly shaped structure element.

Figure 6A:
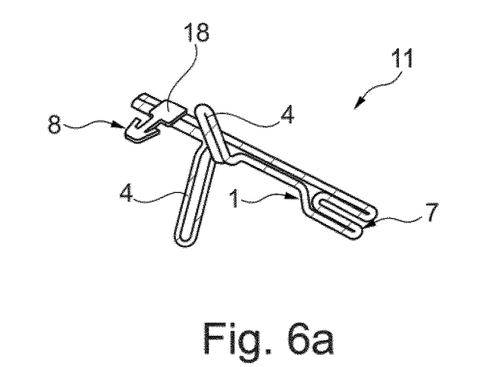
Figure 6B:
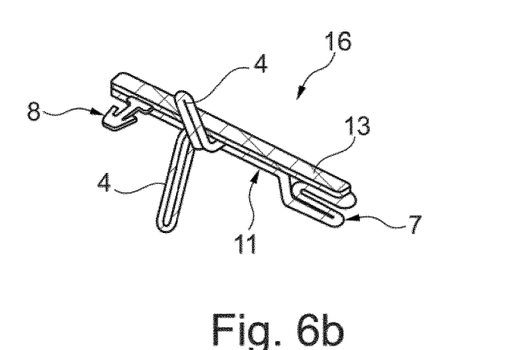
Figure 7A:
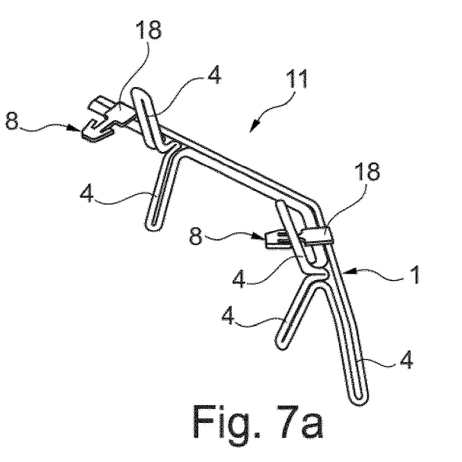
Figure 7B:
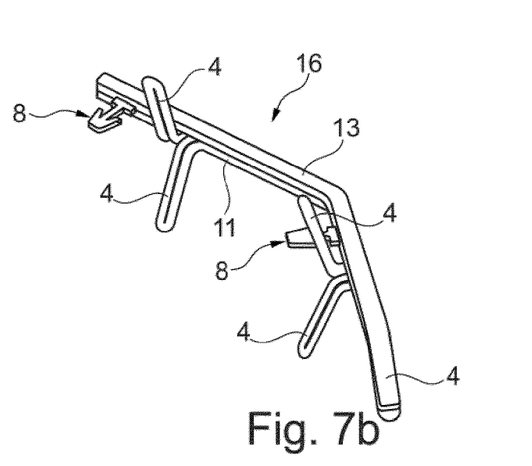

FIGS. 6a and 6b moreover depict a hook 7 of the support element 11; this hook serves in a manner similar to the fastening element 8 to hold the dam element 16 in position within the structure element. The embodiment in FIGS. 6a and 6b therefore uses only one fastening element 8 in conjunction with the hook 7, and the embodiment in FIGS. 7*a* and 7*b* uses two fastening elements 8, but no support-element hook 7.

Figure 8A:
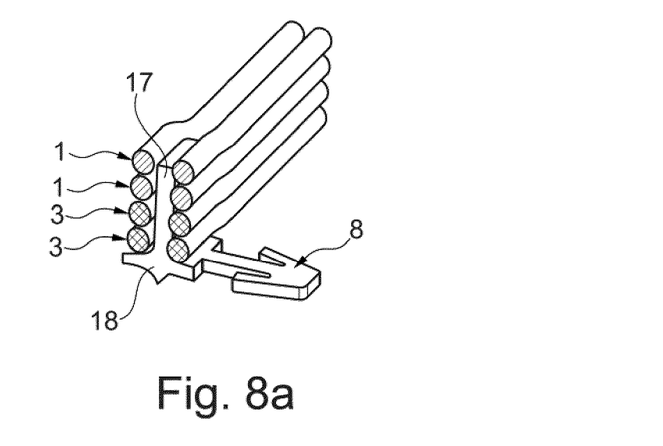
FIGS. 8a to 8c are diagrams of a fastening element integrated within the dam element.
Figure 8B:
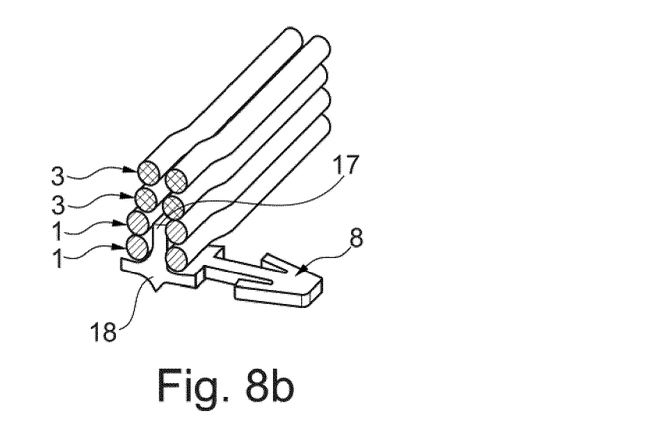
Figure 8C:
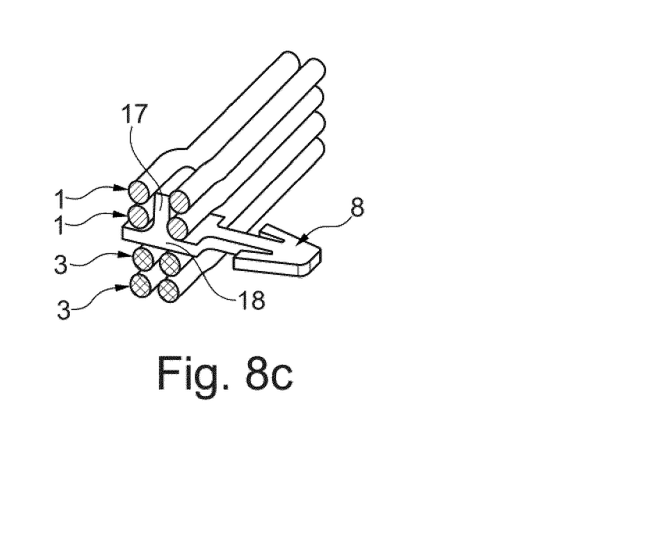

FIGS. 8*a* to 8*c* depict various variants for the attachment of the fastening element 8 within the dam element 16. The fastening element 8 in these embodiments also comprises, alongside the base 18, a projection 17 respectively arranged perpendicularly to the base 18 and bonded thereto. The projection 17 is preferably cramped by laterally adjacent strands 1, 3 in a manner such that the fastening element 8 is anchored within the dam element 16 in horizontal direction (corresponding to a direction within the plane of the dam element). It is moreover likewise possible that the base element 18 is cramped between vertically adjacent strands 1, 3, or layers, as depicted in FIG. 8*c*, in a manner such that the fastening element 8 is also anchored within the dam element 16 in vertical direction (corresponding to a direction perpendicular to the plane of the dam element). It is also possible, in an alternative to the above, that the base 18 of the fastening element 8 is arranged to be externally in contact with the support element 11 (FIG. 8*b*) or with the expandable element 13 (FIG. 8*a*). A suitable variant can be selected here as required by the design and intended purpose of the fastening element 8 and of the dam element 16.

FIGS. 9*a* to 9*d* depict an example of a process for the production of a dam element.

Figure 9A:
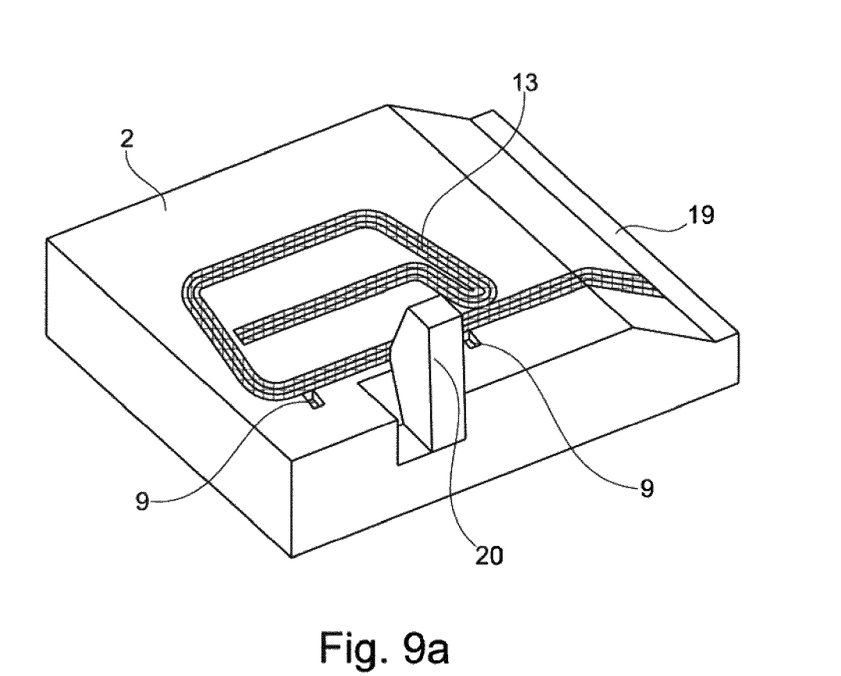
FIGS. 9a to 9d are diagrams of an example of a process for the production of dam element.

In FIG. 9*a*, the bed element 2 is first provided. At least one strand of the second material 13 is then printed onto this bed element 2.

Figure 9B:
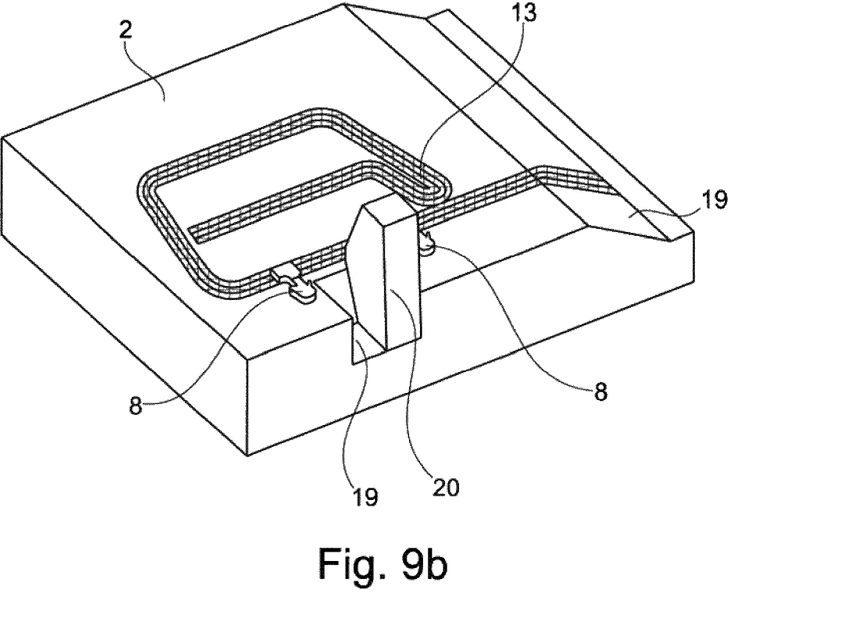

FIG. 9*b* depicts the manner in which fastening elements 8 can be placed into positioning elements 9 in order to secure the fastening elements at the intended position within the dam element.

Figure 9C:
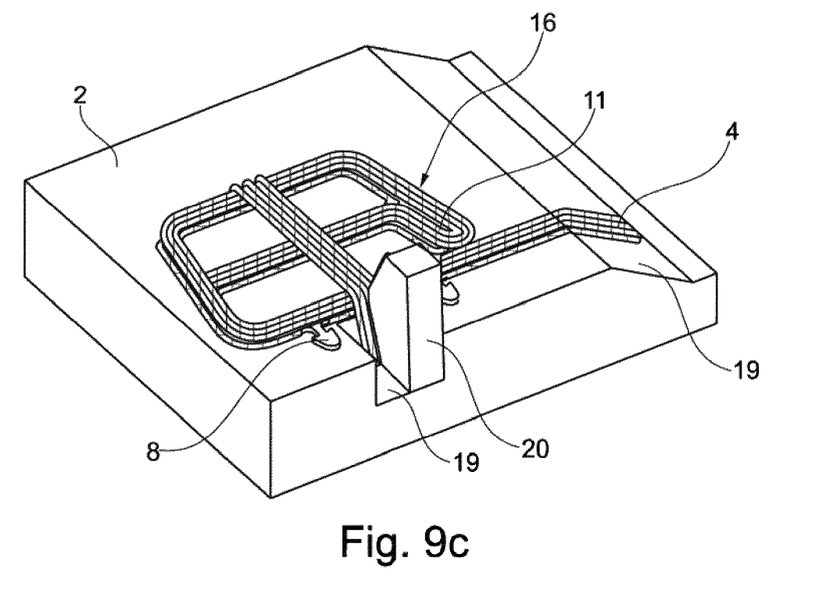

In FIG. 9*c*, at least one strand of the first material is then printed onto the second material to form the support element 11. It can be seen here that the second material, or the support element 11, completely covers the expandable element 13. The fastening elements 8 are moreover cramped between the expandable element 13 and the support element 11.

Figure 9D:
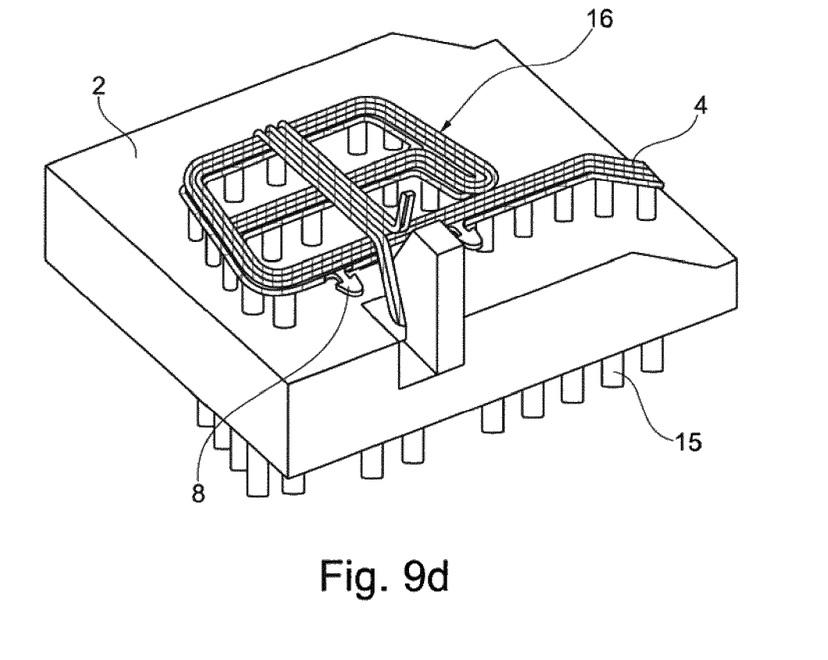

In FIG. 9*d*, the dam element 16 is removed from the bed element 2. Ejector elements 15 are moved here relatively to the bed element 2 in a manner that lifts the dam element 16 from the bed element 2.

The bed element 2 in this example of an embodiment in FIGS. 9*a* to 9*d* has depressions 19 and elevations 20. These depressions 19 and elevations 20 serve for the formation of arms 4 configured at an angle to the plane of the dam element 16. These arms 4 can by way of example be used as three-dimensional stabilizers of the dam element 16, or else for the formation of complex three-dimensional shaping, in order to permit maximization of efficiency in filling more complex cavities in structure elements.

From FIG. 9*c* it can moreover be seen that strands of the material which is printed as second material onto the previously printed material located on the bed element can also be printed directly onto the bed element 2, and do not have to be printed exclusively onto the previously printed strands of the material first printed. This leads, in this embodiment, to the formation of a stay which by way of example increases mechanical stability of the support element 11.

What is claimed is:

1. A dam element for the damming of a structure element within a vehicle, wherein the dam element comprises:
    a support element consisting of at least one printed strand of a first material, where the first material is in a solid physical state at least up to a temperature of from 120° C. to 200° C.; and
    an expandable element consisting of at least one printed strand of a second material, where the second material is expandable at a temperature between 120° C. and 200° C.,
    wherein the dam element has, at a point of greatest thickness, measured perpendicularly to a plane of the dam element, at least two, and at most ten, mutually superposed layers.

2. The dam element as claimed in claim 1, wherein the dam element has at least one arm which is at least to some extent at an angle to the plane of the dam element, and which is composed of the first material or of the second material or of the first and the second material.

3. The dam element as claimed in claim 1, wherein the printed strands of the first material and/or of the second material have a rounded cross section with diameter from 1 mm to 6 mm, or a cross section with height from 1 mm to 6 mm and width from 2 mm to 30 mm.

4. The dam element as claimed in claim 1, wherein the support element and/or the expandable element consist(s) of at least one, and at most ten, trace(s).

5. The dam element as claimed in claim 1, wherein the dam element comprises a fastening element for the fastening of the dam element.

6. The dam element as claimed in claim 5, wherein the fastening element comprises injection-molded plastic and/or comprises metal.

7. The dam element as claimed in claim 5, wherein the fastening element has a base which lies within the plane of the dam element, and which is cramped between two mutually superposed layers, or is in contact only with one layer.

8. The dam element as claimed in claim 5, wherein the fastening element has a projection which is configured perpendicularly to the base, and which is cramped between two strands that, within the plane of the dam element, are adjacent to one another, or which is in contact only with one strand.

9. A system with a structure element and with, arranged therein, a dam element as claimed in claim 1.

10. The system as claimed in claim 9 wherein, before an expansion of the expandable element, the dam element covers from 20% to 60% of a cross section of the structure element.

11. A process for the production of a dam element with a support element and with an expandable element for the use within a structure element of a vehicle, wherein the process comprises the steps of:
    provision of a bed element;
    printing of at least one strand made of a first material for the formation of a support element, where the first material is in a solid physical state at least up to a temperature of from 120° C. to 200° C.;
    printing of at least one strand made of a second material for the formation of an expandable element, where the second material is expandable at a temperature of from 120° C. to 200° C.; and
    removal of the dam element from the bed element,
    wherein the at least one strand made of the first material and the at least one strand made of the second material are printed in a manner such that the dam element has, at a point of greatest thickness, measured perpendicularly to a plane of the dam element, at least two, and at most ten, mutually superposed layers.

12. The process as claimed in claim 11, wherein the process comprises the further step of:
   reuse of the bed element for production of a following dam element after a dam element has been removed from the bed element.

13. The process as claimed in claim 11, wherein the bed element has depressions and/or elevations for the formation of arms which at least to some extent are at an angle to the plane of the dam element.

14. The process as claimed in claim 11, wherein the bed element has a positioning element, and where the process comprises the step of:
   attachment of a fastening element within the positioning element and onto at least one layer of the first and/or of the second material.

15. The process as claimed in claim 11, wherein during removal of the dam element from the bed element ejector elements are moved in relation to the bed element.

* * * * *